United States Patent
Jaffri et al.

(10) Patent No.: US 11,200,388 B2
(45) Date of Patent: Dec. 14, 2021

(54) SYSTEM AND METHOD FOR ACCURATELY READING RADIO-FREQUENCY IDENTIFICATION TAGS AT A BIOPTIC BARCODE READER

(71) Applicant: ZEBRA TECHNOLOGIES CORPORATION, Lincolnshire, IL (US)

(72) Inventors: Rehan K. Jaffri, New York, NY (US); Sean Connolly, Stony Brook, NY (US); Mark W. Duron, Mastic, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/509,494

(22) Filed: Jul. 12, 2019

(65) Prior Publication Data

US 2021/0012072 A1  Jan. 14, 2021

(51) Int. Cl.
*G06K 7/10* (2006.01)
*H01Q 21/24* (2006.01)
*G06K 7/14* (2006.01)

(52) U.S. Cl.
CPC ....... *G06K 7/10356* (2013.01); *G06K 7/1413* (2013.01); *H01Q 21/24* (2013.01)

(58) Field of Classification Search
CPC .. G06K 7/10; G06K 7/10316; G06K 7/10326; G06K 7/10336; G06K 7/10346; G06K 7/10356; G06K 7/1413; H01Q 21/24
USPC ............................ 235/383, 451, 462.14, 492
See application file for complete search history.

(56) References Cited

U.S. PATENT DOCUMENTS

| | | | | |
|---|---|---|---|---|
| 2008/0231420 | A1* | 9/2008 | Koyama | G06K 7/10079 340/10.1 |
| 2009/0101717 | A1* | 4/2009 | Claessen | G06K 7/10702 235/462.13 |
| 2010/0079245 | A1* | 4/2010 | Perng | G06K 7/10346 340/10.1 |
| 2011/0306296 | A1* | 12/2011 | Takahashi | H01Q 1/2216 455/41.1 |
| 2012/0105205 | A1* | 5/2012 | Claessen | G07G 1/0018 340/10.1 |
| 2012/0280887 | A1* | 11/2012 | Hamabe | H01Q 9/42 343/893 |
| 2013/0229262 | A1* | 9/2013 | Bellows | G06K 7/10356 340/10.1 |

(Continued)

*Primary Examiner* — Tuyen K Vo
(74) *Attorney, Agent, or Firm* — Yuri Astvatsaturov

(57) ABSTRACT

A bioptic barcode reader configured to be supported by a workstation and having a lower housing comprising a platter having a generally horizontal window and a tower portion extending generally perpendicular to the lower housing and having a generally vertical window. A multi-axis radio-frequency identification antenna assembly is positioned within the tower portion of the bioptic barcode reader and includes first, second, and third antennas. The first antenna is configured to emit a radiation pattern oriented in a first direction, the second antenna is configured to emit a radiation pattern oriented in a second direction, substantially orthogonal to the first direction, and the third antenna is configured to emit a radiation pattern oriented in a third direction, substantially orthogonal to the first direction and the second direction.

26 Claims, 11 Drawing Sheets

(56) References Cited

U.S. PATENT DOCUMENTS

2016/0111770 A1* 4/2016 Choi .................... H01Q 1/48
                                                    343/841
2017/0330426 A1* 11/2017 Jaffri ................ G06K 19/07758

* cited by examiner

SYSTEM AND METHOD FOR ACCURATELY READING RADIO-FREQUENCY IDENTIFICATION TAGS AT A BIOPTIC BARCODE READER

FIELD OF THE DISCLOSURE

The present patent relates generally to bioptic barcode readers and, in particular, to bioptic barcode readers having radio-frequency identification (RFID) antenna arrangements for reading RFID tags.

BACKGROUND

RFID tags are increasingly being used to track, locate, and check inventory on items. In a retail environment, RFID tags help determine whether an item is on the shelf, available in the back room, in the wrong location, or is no longer in the store. When an item having an RFID tag is read last by an RFID reader near the store exit, it currently cannot be determined whether the particular item has been sold, stolen, or not in the store for another reason.

Therefore, there is a need to be able to identify whether an item having an RFID tag was sold or was in close proximity to a point of sale (POS), such as a bioptic barcode reader used at the POS, which will help in reporting accuracy on items sold and in keeping track of inventory and reporting shrink.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed examples, and explain various principles and advantages of those embodiments.

Figure 1:
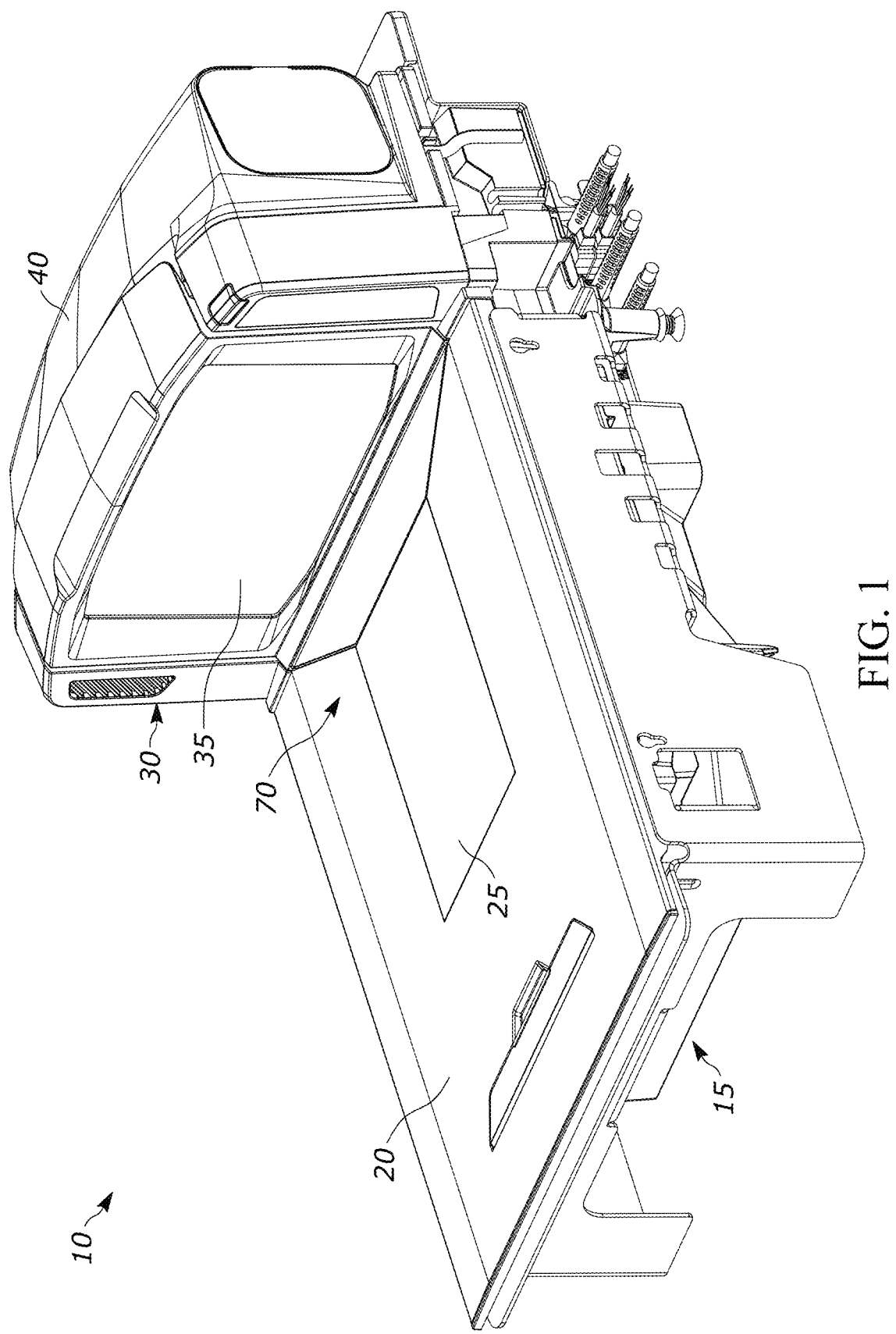
FIG. 1 illustrates a front perspective view of an example bioptic barcode reader.

The apparatus and method components have been represented where appropriate by conventional symbols in the drawings, showing only those specific details that are pertinent to understanding the disclosed examples so as not to obscure the disclosure with details that will be readily apparent to those of ordinary skill in the art having the benefit of the description herein.

DETAILED DESCRIPTION

The examples disclosed herein relate to bioptic barcode readers having multi-axis RFID antenna assemblies to address the problem, or accuracy, of tracking an item sold and/or no longer in a retail location. The examples herein include antenna assemblies having multiple antennas located within a bioptic barcode reader used at a point of sale to indicate whether an item having an RFID tag was sold or was in close proximity to the bioptic barcode reader. This not only helps in reporting accuracy on items sold but also in keeping track of inventory and reporting shrink.

The example bioptic barcode readers herein consist of multi-axis RFID antenna assemblies to read RFID tags, irrespective of orientation, when presented at the bioptic barcode reader. To accomplish this, in one example, the antenna assembly includes first, second, and third antennas positioned within the tower of the bioptic barcode reader so that each antenna emits a radiation pattern that is oriented orthogonal to the other antennas to scan for RFID tags in proximity to the bioptic barcode reader. In another example, the antenna assembly includes first and second polarized circular antennas positioned within the tower of the bioptic scanner so that each antenna emits a radiation pattern that is oriented orthogonal to the other to scan for RFID tags in proximity to the bioptic barcode reader.

Typically, bioptic barcode readers act as a highly reflective radio-frequency (RF) environment because they include large metallic surfaces, such as mirrors and cables integrated within. Therefore, the antennas in the example antenna assemblies are arranged such that the RF energy is maximized around the bioptic barcode reader and drops off exponentially as the distance from the bioptic barcode reader is increased. This helps in accurately reading RFID tags only in proximity to the bioptic barcode reader, which could be RFID tagged items being scanned at a checkout or items concealed in proximity to the bioptic barcode reader.

Figure 2:
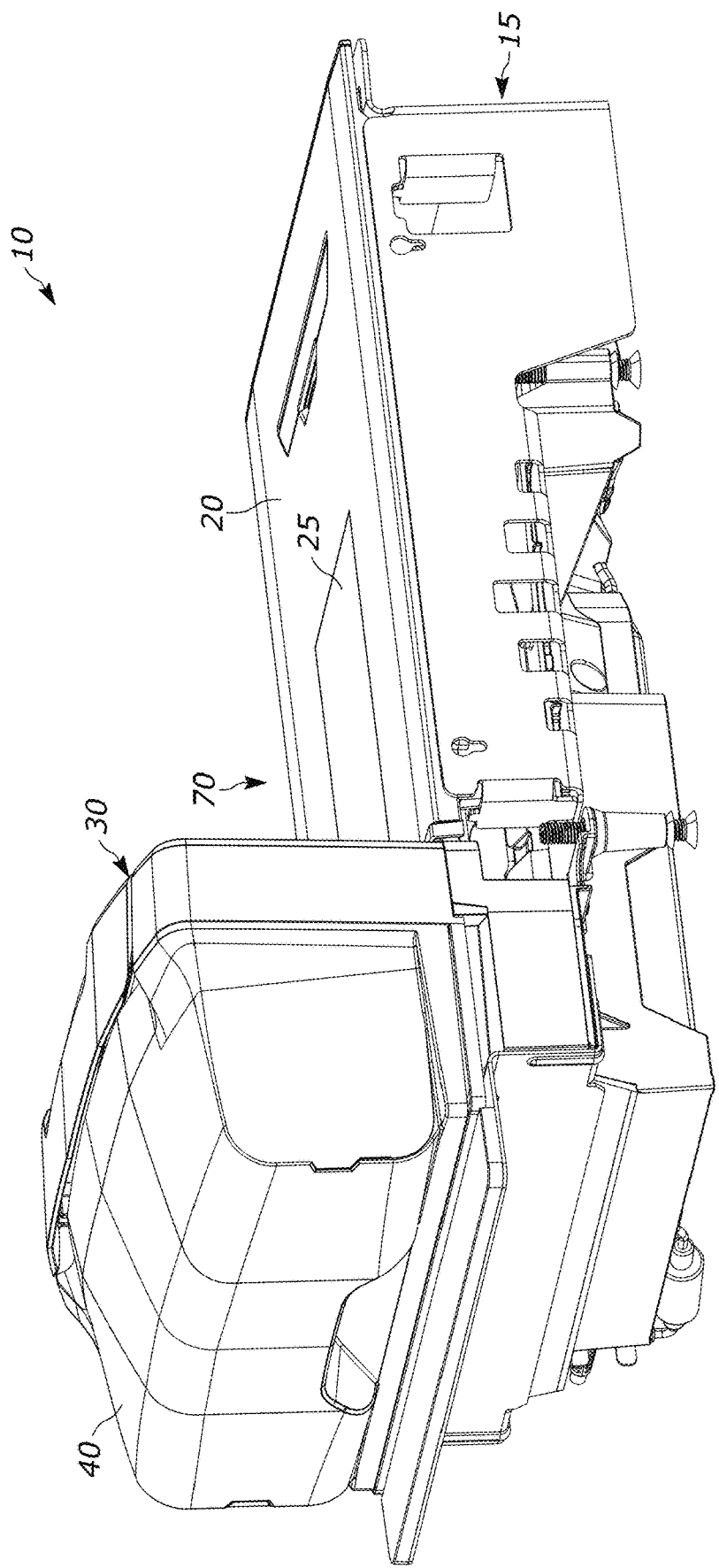
FIG. 2 illustrates a rear perspective view of the bioptic barcode reader of FIG. 1.

Referring to FIGS. 1-2, a first example bioptic barcode reader 10 is shown, which can be configured to be supported by a workstation. Bioptic barcode reader 10 includes a lower housing 15 that has a platter 20 and a generally horizontal window 25. Platter 20 can be a stationary platter or can be configured to be a weighing platter and horizontal window 25 is positioned within platter 20 to allow a first set of optical components positioned within lower housing 15 to direct a first field of view through horizontal window 25. A tower portion 30 extends generally perpendicular to lower housing 15 and includes a generally vertical window 35 that is positioned within tower portion 30 to allow a second set of optical components positioned within tower portion 30 to direct a second field of view through vertical window 35. The first and second fields of view define a product scanning region 70 of the bioptic barcode reader 10 where a product can be scanned for sale at the point of sale.

Figure 3:
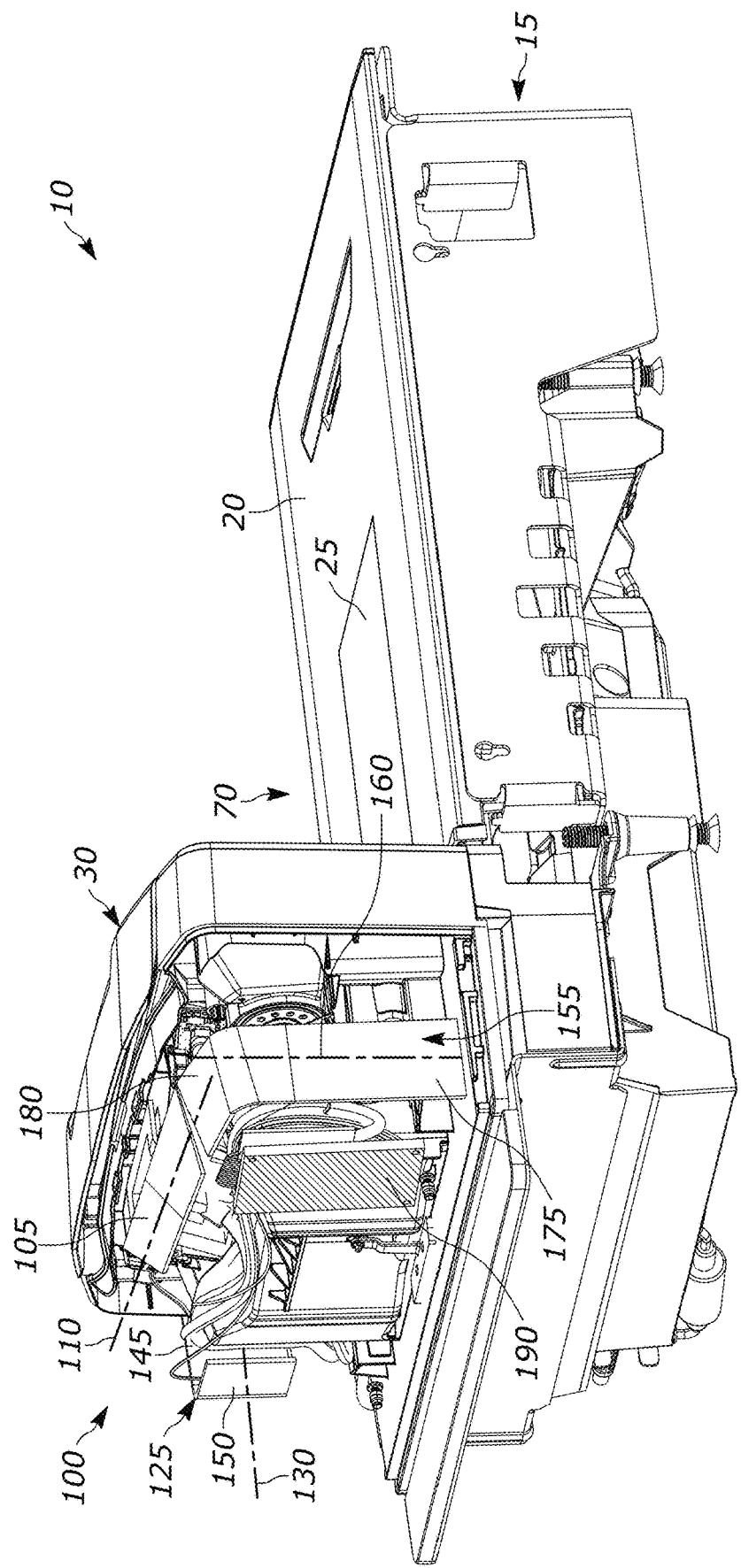
FIG. 3 illustrates the bioptic barcode reader of FIG. 2 with the back cover removed, with a first example multi-axis RFID antenna assembly within the bioptic barcode reader.

Referring to FIG. 3, bioptic barcode reader 10 includes a multi-axis RFID antenna assembly 100 positioned within tower portion 30. Antenna assembly 100 has first antenna 105 positioned along a top 50 of tower portion 30, second antenna 125 positioned along a first vertical sidewall 55 of tower portion 30, a third antenna positioned along a second vertical sidewall 60 of tower portion 30, opposite first vertical sidewall 55, and an RFID radio 190 in communication with the first, second, and third antennas 105, 125, 155. First, second, and third antennas 105, 125, 155 are positioned and oriented within tower portion 30 so that they are "spatially diverse" to avoid reflective structures, such as mirrors and components in tower portion 30, which can reflect or bounce RF energy from first, second, and third antennas 105, 125, 155.

Figure 5:
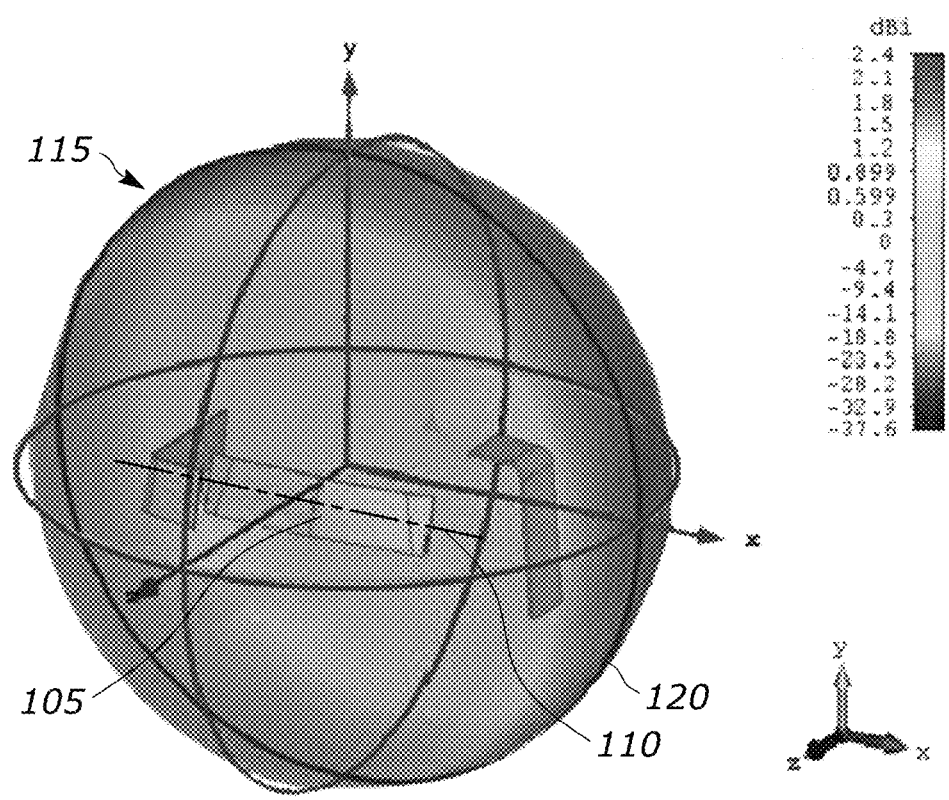
FIG. 5 illustrates a radiation pattern emitted by a first antenna of the antenna assembly of FIG. 3.

First antenna 105 can be a dipole antenna, a monopole antenna, a helical antenna, a slot antenna, a patch antenna, a loop antenna, or an antenna array and, as can best be seen in FIG. 5, is configured to emit a radiation pattern 115 that is oriented in a first direction 120, which in FIG. 5 is along the X-Y plane. Radiation pattern 115 has a first polarization, which can be one of vertical linear polarization, horizontal linear polarization, angular linear polarization, or circular polarization.

Figure 6:
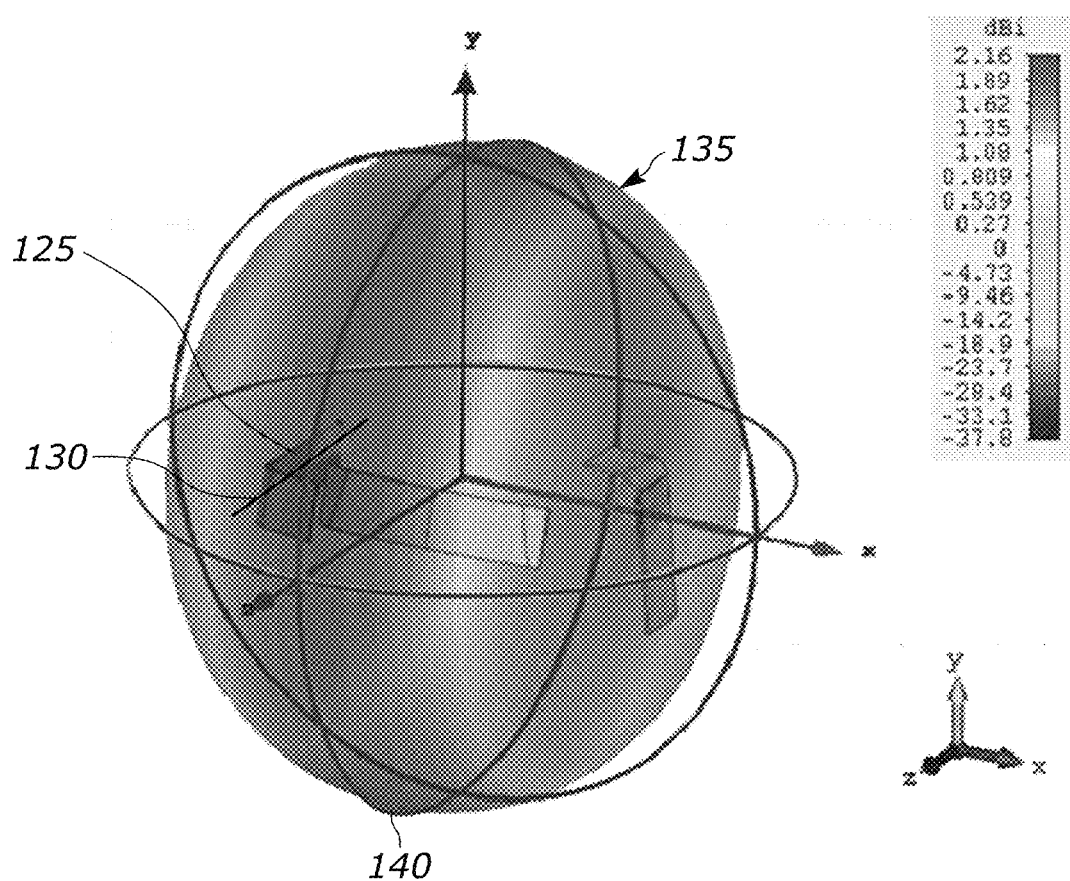
FIG. 6 illustrates a radiation pattern emitted by a second antenna of the antenna assembly of FIG. 3.

Second antenna 125 can also be a dipole antenna, a monopole antenna, a helical antenna, a slot antenna, a patch antenna, a loop antenna, or an antenna array and has a longitudinal axis 130 that is substantially orthogonal to a longitudinal axis 110 of first antenna 105. As can best be seen in FIG. 6, second antenna 125 is configured to emit a radiation pattern 135 that is oriented in a second direction 140, substantially orthogonal to first direction 120, which in FIG. 6 is along the Y-Z plane, and has a second polarization, which can be different from the first polarization of first antenna 105, and can be one of vertical linear polarization, horizontal linear polarization, angular linear polarization, or circular polarization. In the particular example shown, second antenna 125 has a first portion 145 and a second portion 150 that extends substantially orthogonal to first portion 145.

Figure 7:
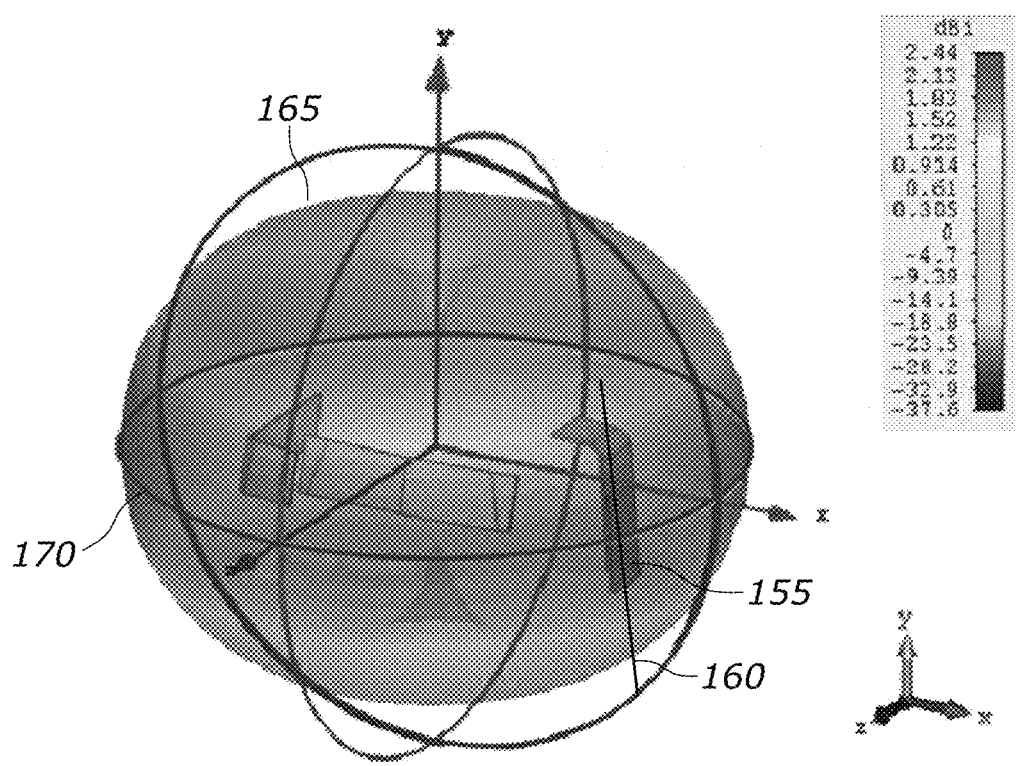
FIG. 7 illustrates a radiation pattern emitted by a third antenna of the antenna assembly of FIG. 3.

Third antenna 155 can also be a dipole antenna, a monopole antenna, a helical antenna, a slot antenna, a patch antenna, a loop antenna, or an antenna array and has a longitudinal axis 160 that is substantially orthogonal to longitudinal axis 130 of second antenna 125 and to longitudinal axis 110 of first antenna 105. As can best be seen in FIG. 7, third antenna 155 is configured to emit a radiation pattern 165 that is oriented in a third direction 170, substantially orthogonal to first direction 120 and second direction 140, which in FIG. 7 is along the X-Z plane, and has a third polarization, which can be different from the first polarization of first antenna 105 and the second polarization of second antenna 125, and can be one of vertical linear polarization, horizontal linear polarization, angular linear polarization, or circular polarization. In the particular example shown, third antenna 155 has a first portion 175 and a second portion 180 that extends substantially orthogonal to first portion 175.

First, second, and third antennas 105, 125, 155 can have baluns printed directly on the antennas to reduce board level coupling and minimize current leaking onto coaxial cables connecting first, second, and third antennas 105, 125, 155 to RFID radio 190 or standard coaxial connectors can be used, which would allow current leaking onto the coaxial cables, and the routing of the coaxial cables can be controlled to use the coaxial cables as a part of the antennas to reflect RF energy towards product scanning region 70.

The position and orientation of first, second, and third antennas 105, 125, 155 described above configures first, second, and third antennas 105, 125, 155 to cover all axes in product scanning region 70 of bioptic barcode reader 10 and read a RFID tag presented in any angular orientation in product scanning region 70. Therefore, first, second, and third antennas 105, 125, 155 cover the entire 4 pi steradian space within a few inches of bioptic barcode reader 10, maximizing energy around bioptic barcode reader 10 with minimum nulls for accurate reading of RFID tags.

Figure 4:
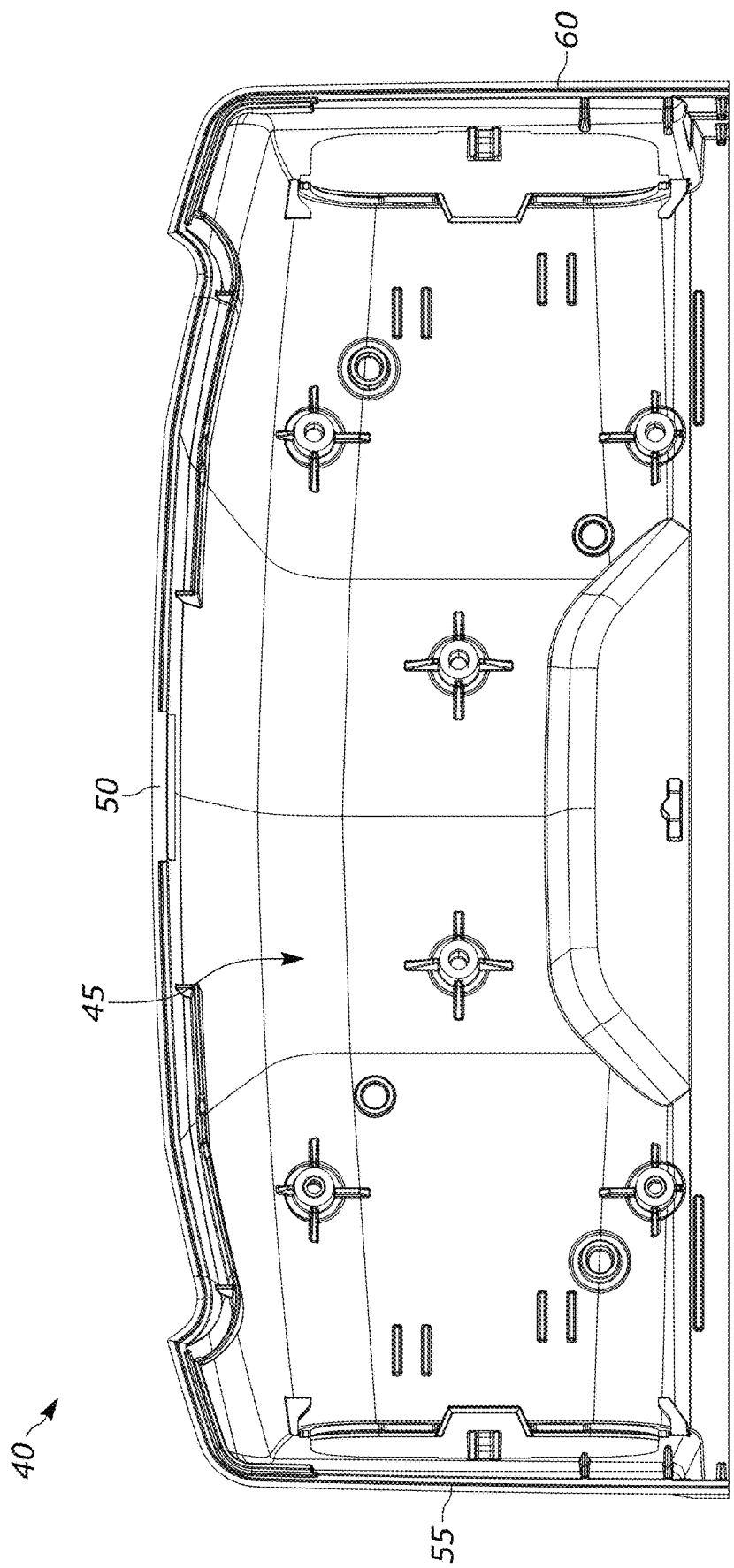
FIG. 4 illustrates a rear plan view of an example back cover of the bioptic barcode reader of FIG. 1.

To further direct the RF radiation from first, second, and third antennas 105, 125, 155 towards product scanning region 70, RFID radio 190 can be positioned within tower portion 30 and oriented to act as a reflector to reflect RF energy from first, second, and third antennas 105, 125, 155 towards product scanning region 70. Alternatively, when not used as a reflector, RFID radio 190 can also be positioned outside of tower portion 30 of bioptic barcode reader 10 so that RFID radio 190 does not act as another potential reflective surface within tower portion 30. Furthermore, as best seen in FIG. 4, a back cover 40 of tower portion 30 could also include a reflector panel 45 that reflects RF energy from first, second, and third antennas 105, 125, 155 towards product scanning region 70, in addition to or instead of the RFID radio 190 acting as a reflector.

Using the above RFID antenna assembly 100 within tower portion 30 of bioptic barcode reader 10, first, second, and third antennas 105, 125, 155 scan for RFID tags by emitting radiation patterns in first, second, and third directions 120, 140, 170, respectively, that are each orthogonal to the others and can read an RFID tag present in any orientation in product scanning region 70 of bioptic barcode reader 10.

Figure 8:
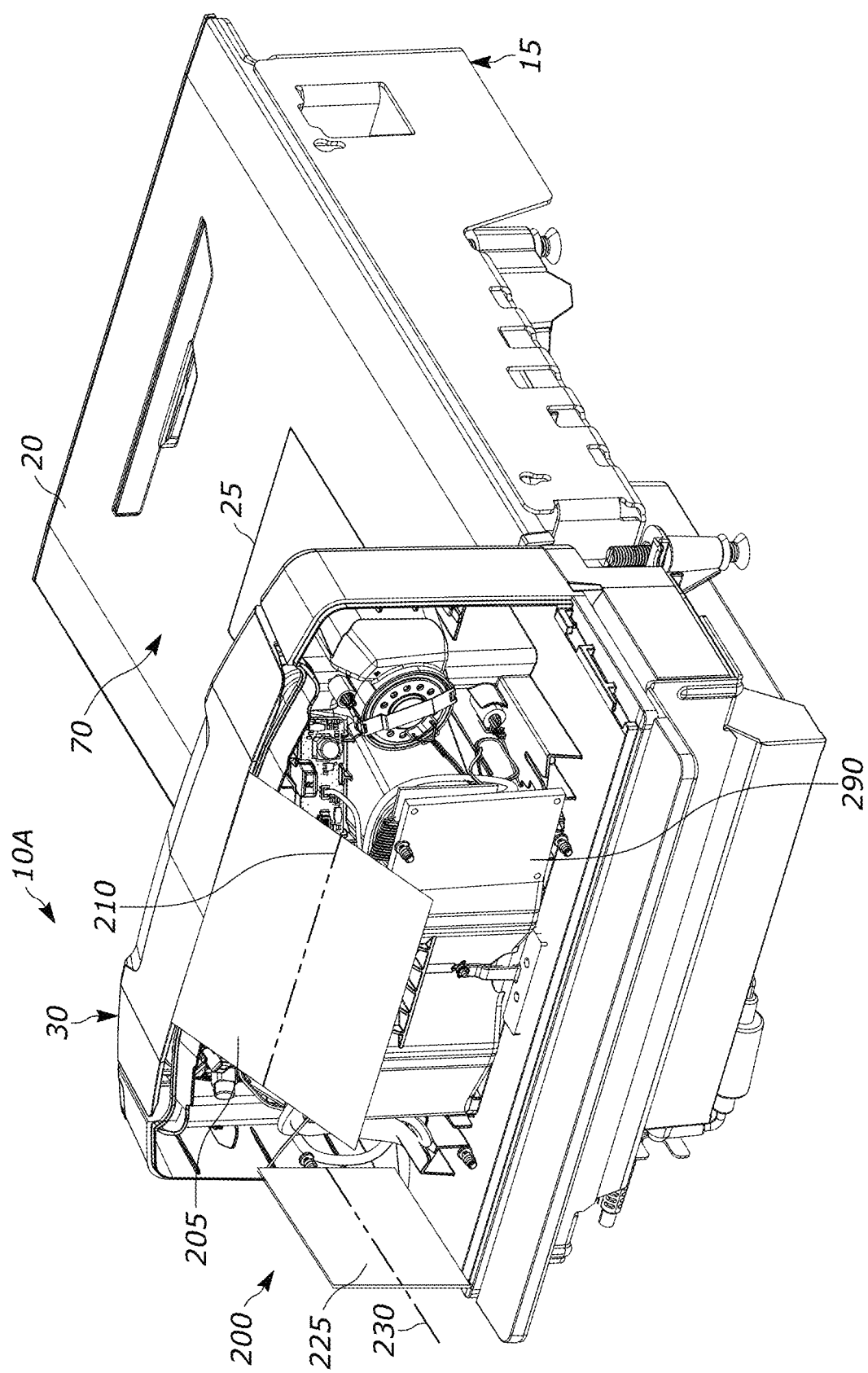
FIG. 8 illustrates another example bioptic barcode reader with the back cover removed, with a second example multi-axis RFID antenna assembly within the bioptic barcode reader.
Figure 9:
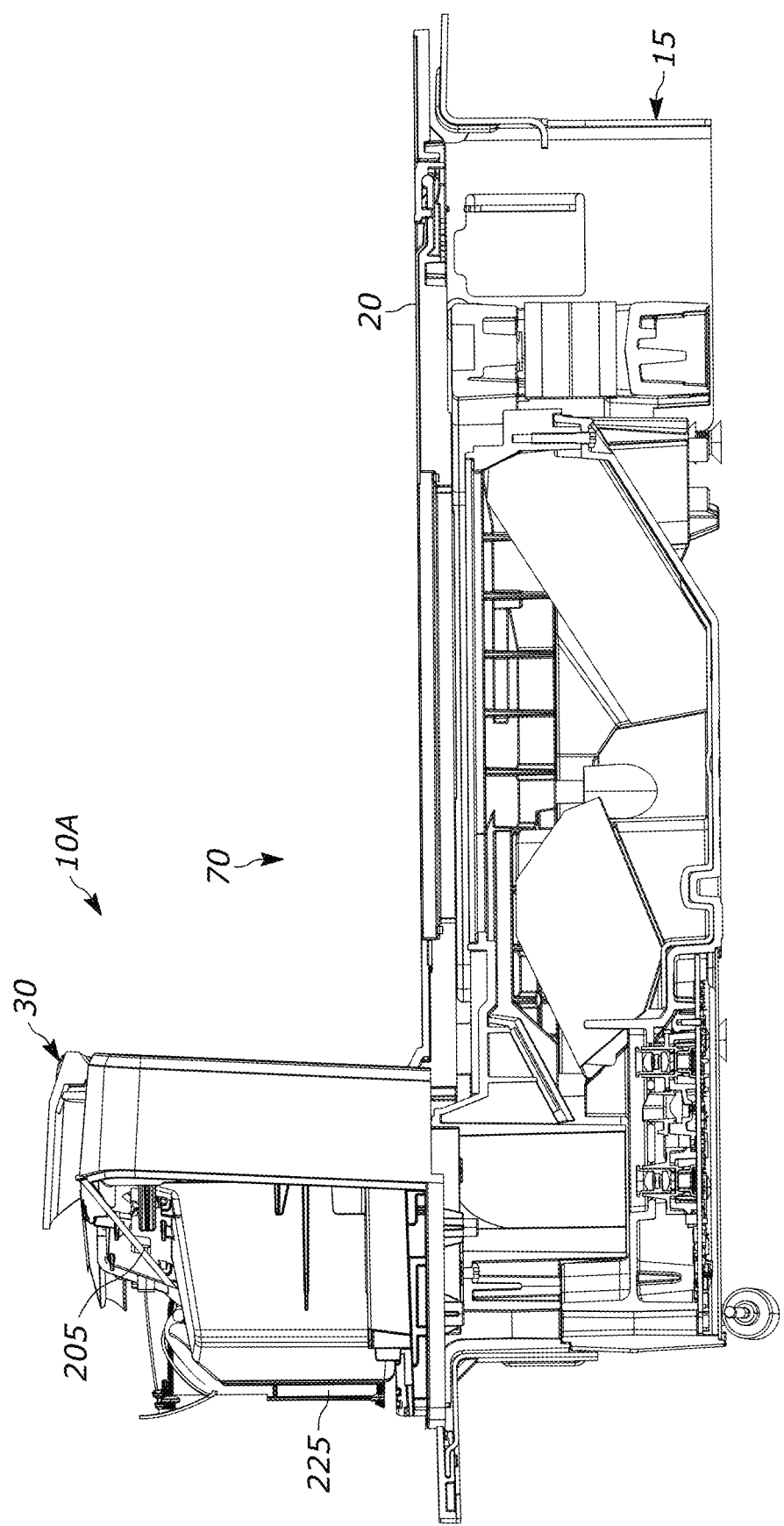
FIG. 9 illustrates a side plan view of the bioptic barcode reader of FIG. 8.

Referring to FIGS. 8-9, a second example bioptic barcode reader 10A is shown, which can be configured to be supported by a workstation. Bioptic barcode reader 10A has the same basic components of bioptic barcode reader 10 described above, but includes multi-axis RFID antenna assembly 200 positioned within tower portion 30, rather than RFID antenna assembly 100. Antenna assembly 200 has first polarized circular antenna 205 positioned along top 50 of tower portion 30, second polarized circular antenna 225 positioned along second vertical sidewall 60 of tower portion 30, and an RFID radio 290 in communication with the first and second antennas 205, 225. First and second polarized circular antennas 205, 225 are positioned and oriented within tower portion 30 so that they are "spatially diverse" to avoid reflective structures, such as mirrors and components in tower portion 30, which can reflect or bounce RF energy from first and second polarized circular antennas 205, 225.

Figure 10:
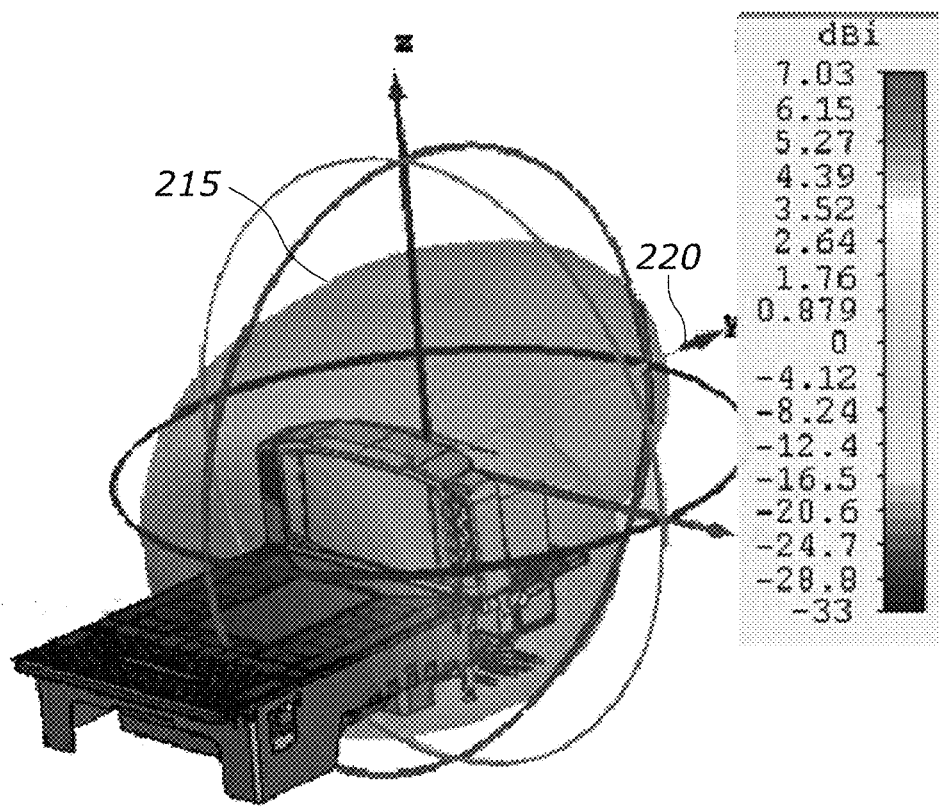
FIG. 10 illustrates a radiation pattern emitted by a first antenna of the antenna assembly of FIG. 8.

First antenna 205 can be a patch antenna, a bifilar helical antenna, a quadrifilar helical antenna, or an antenna array and, as can best be seen in FIG. 10, is configured to emit a radiation pattern 215 that is oriented in a first direction 220, which in FIG. 10 is along the Y axis.

Figure 11:
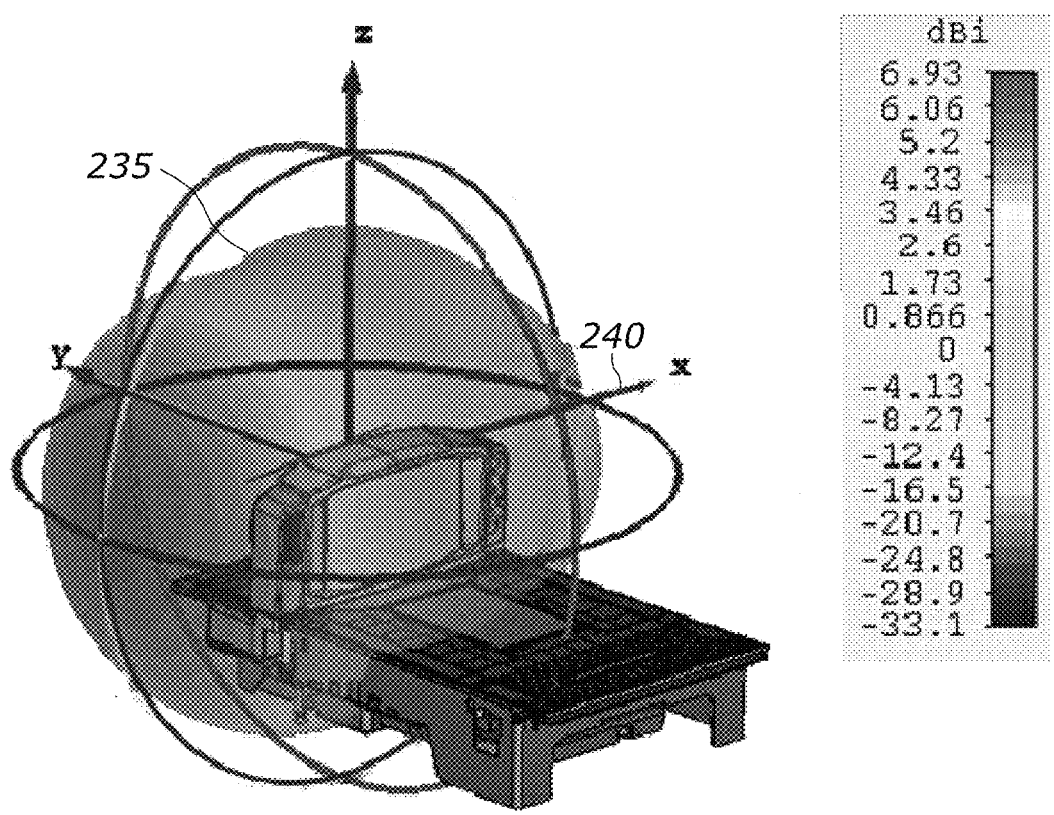
FIG. 11 illustrates a radiation pattern emitted by a second antenna of the antenna assembly of FIG. 8.

Second antenna 225 can also be a patch antenna, a bifilar helical antenna, a quadrifilar helical antenna, or an antenna array and has a longitudinal axis 230 that is substantially orthogonal to a longitudinal axis 210 of first antenna 205. As can best be seen in FIG. 11, second antenna 225 is configured to emit a radiation pattern 235 that is oriented in a second direction 240, substantially orthogonal to first direction 220, which in FIG. 11 is along the X axis.

First and second antennas 205, 225 can have baluns printed directly on the antennas to reduce board level coupling and minimize current leaking onto coaxial cables connecting first and second antennas 205, 225 to RFID radio 290 or standard coaxial connectors can be used, which would allow current leaking onto the coaxial cables, and the routing of the coaxial cables can be controlled to use the coaxial cables as a part of the antennas to reflect RF energy towards product scanning region 70.

The position and orientation of first and second antennas 205, 225 described above configures first and second antennas 205, 225 to cover all axes in product scanning region 70 of bioptic barcode reader 10A and read a RFID tag presented in any angular orientation in product scanning region 70. Therefore, first and second antennas 205, 225 cover the entire 4 pi steradian space within a few inches of bioptic barcode reader 10A, maximizing energy around bioptic barcode reader 10A with minimum nulls for accurate reading of RFID tags.

To further direct the RF radiation from first and second antennas 205, 225 towards product scanning region 70, RFID radio 290 can be positioned within tower portion 30 and oriented to act as a reflector to reflect RF energy from first and second antennas 205, 225 towards product scanning region 70. Alternatively, when not used as a reflector, RFID radio 290 can also be positioned outside of tower portion 30 of bioptic barcode reader 10A so that RFID radio 290 does not act as another potential reflective surface within tower portion 30. Furthermore, back cover 40 of tower portion 30 could also include reflector panel 45 that reflects RF energy from first and second antennas 205, 225 towards product scanning region 70, in addition to or instead of the RFID radio 290 acting as a reflector.

Using the above RFID antenna assembly 200 within tower portion 30 of bioptic barcode reader 10A, first and second antennas 205, 225 scan for RFID tags by emitting radiation patterns in first and second directions 220, 240, respectively, that are orthogonal to each other and can read an RFID tag present in any orientation in product scanning region 70 of bioptic barcode reader 10A.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations. Moreover, no steps of any method disclosed herein shall be understood to have any specific order unless it is expressly stated that no other order is possible or required by the remaining steps of the respective method. Also, at least some of the figures may or may not be drawn to scale.

The benefits, advantages, solutions to problems, and any element(s) that may cause any benefit, advantage, or solution to occur or become more pronounced are not to be construed as a critical, required, or essential features or elements of any or all the claims. The legal scope of the property right is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A bioptic barcode reader configured to be supported by a workstation, the bioptic barcode reader comprising:
   a lower housing comprising a platter having a generally horizontal window;
   a tower portion extending generally perpendicular to the lower housing and having a generally vertical window;
   a multi-axis radio-frequency identification antenna assembly positioned within the tower portion of the bioptic barcode reader, the antenna assembly comprising:
      a first antenna configured to emit a radiation pattern oriented in a first direction;
      a second antenna configured to emit a radiation pattern oriented in a second direction, substantially orthogonal to the first direction; and
      a third antenna configured to emit a radiation pattern oriented in a third direction, substantially orthogonal to the first direction and the second direction.

2. The bioptic barcode reader of claim 1, wherein:
   the radiation pattern of the first antenna has a first polarization;
   the radiation pattern of the second antenna has a second polarization, different than the first polarization; and
   the radiation pattern of the third antenna has a third polarization, different that the first polarization and the second polarization.

3. The bioptic barcode reader of claim 2, wherein:
   the first polarization is one of vertical linear polarization, horizontal linear polarization, angular linear polarization, or circular polarization;
   the second polarization is one of vertical linear polarization, horizontal linear polarization, angular linear polarization, or circular polarization; and
   the third polarization is one of vertical linear polarization, horizontal linear polarization, angular linear polarization, or circular polarization.

4. The bioptic barcode reader of claim 1, wherein the first, second, and third antennas are one of dipole antennas, monopole antennas, helical antennas, slot antennas, patch antennas, loop antennas, or antenna arrays.

5. The bioptic barcode reader of claim 1, wherein each of the first, second, and third antennas includes a longitudinal axis, the longitudinal axis of the second antenna is substantially orthogonal to the longitudinal axis of the first antenna, and the longitudinal axis of the third antenna is substantially orthogonal to the longitudinal axis of the first antenna and the longitudinal axis of the second antenna.

6. The bioptic barcode reader of claim 1, wherein the first, second, and third antennas are positioned and oriented such that the first, second, and third antennas are configured to read a radio-frequency identification tag presented in any angular orientation at a product scanning region of the bioptic barcode reader.

7. The bioptic barcode reader of claim 1, further comprising a radio-frequency identification radio in communication with the first, second, and third antennas, wherein the radio-frequency identification radio is positioned within the tower portion of the bioptic barcode reader and oriented to act as a reflector for the first, second, and/or third antennas to reflect radio-frequency energy from the first, second, and third antennas towards a product scanning region of the bioptic barcode reader.

8. The bioptic barcode reader of claim 1, wherein the tower portion of the bioptic barcode reader includes a back cover having a reflector panel that reflects a radio-frequency energy from the first, second, and third antennas towards a product scanning region of the bioptic barcode reader.

9. The bioptic barcode reader of claim 1, wherein:
   the first antenna is positioned along a top of the tower portion;
   the second antenna is positioned along a first vertical sidewall of the tower portion; and
   the third antenna is positioned along a second vertical sidewall of the tower portion, opposite the first vertical sidewall.

10. The bioptic barcode reader of claim 1, wherein:
    the second antenna has a first portion and a second portion extending substantially orthogonal to the first portion; and
    the third antenna has a first portion and a second portion extending substantially orthogonal to the first portion.

11. A bioptic barcode reader configured to be supported by a workstation, the bioptic barcode reader comprising:
    a lower housing comprising a platter having a generally horizontal window;
    a tower portion extending generally perpendicular to the lower housing and having a generally vertical window;
    a multi-axis radio-frequency identification antenna assembly positioned within the tower portion of the bioptic barcode reader, the antenna assembly comprising:
       a first polarized circular antenna configured to emit a radiation pattern in first direction; and
       a second polarized circular antenna configured to emit a radiation pattern in a second direction, substantially orthogonal to the first direction.

12. The bioptic barcode reader of claim 11, wherein the first and second antennas are one of patch antennas, bifilar helical antennas, quadrifilar helical antennas, or antenna arrays.

13. The bioptic barcode reader of claim 11, wherein each of the first and second antennas includes a longitudinal axis and the longitudinal axis of the second antenna is substantially orthogonal to the longitudinal axis of the first antenna.

14. The bioptic barcode reader of claim 11, wherein the first and second antennas are positioned and oriented such that the first and second antennas are configured to read a radio-frequency identification tag presented in any angular orientation at a product scanning region of the bioptic barcode reader.

15. The bioptic barcode reader of claim 11, further comprising a radio-frequency identification radio in communication with the first and second antennas, wherein the radio-frequency identification radio is positioned within the tower portion of the bioptic barcode reader and oriented to act as a reflector for the first and second antennas to reflect radio-frequency energy from the first and second antennas towards a product scanning region of the bioptic barcode reader.

16. The bioptic barcode reader of claim 9, wherein the tower portion of the bioptic barcode reader includes a back cover having a reflector panel that reflects a radio-frequency energy from the first and second antennas towards a product scanning region of the bioptic barcode reader.

17. The bioptic barcode reader of claim 9, wherein:
the first antenna is positioned along a top of the tower portion; and
the second antenna is positioned along a vertical sidewall of the tower portion.

18. A method of reading a radio-frequency identification tag proximate a bioptic barcode reader configured to be supported by a workstation, the method comprising the steps of:
providing a radio-frequency identification antenna assembly within a tower portion of the bioptic barcode reader, the antenna assembly including a first antenna, a second antenna, and a third antenna;
scanning for the radio-frequency identification tag with the first antenna, the first antenna emitting a radiation pattern in a first direction;
scanning for the radio-frequency identification tag with the second antenna, the second antenna emitting a radiation pattern in a second direction, substantially orthogonal to the first direction; and
scanning for the radio-frequency identification tag with the third antenna, the third antenna emitting a radiation pattern in a third direction, substantially orthogonal to the first and second directions.

19. The method of claim 18, wherein:
the radiation pattern of the first antenna has a first polarization;
the radiation pattern of the second antenna has a second polarization, different than the first polarization; and
the radiation pattern of the third antenna has a third polarization, different that the first polarization and the second polarization.

20. The method of claim 19, wherein:
the first polarization is one of vertical linear polarization, horizontal linear polarization, angular linear polarization, or circular polarization;
the second polarization is one of vertical linear polarization, horizontal linear polarization, angular linear polarization, or circular polarization; and
the third polarization is one of vertical linear polarization, horizontal linear polarization, angular linear polarization, or circular polarization.

21. The method of claim 18, wherein the first, second, and third antennas are one of dipole antennas, monopole antennas, helical antennas, slot antennas, patch antennas, loop antennas, or antenna arrays.

22. The method of claim 18, wherein each of the first, second, and third antennas includes a longitudinal axis and the method comprises the step of orienting the second antenna so that the longitudinal axis of the second antenna is substantially orthogonal to the longitudinal axis of the first antenna and orienting the third antenna so that the longitudinal axis of the third antenna is substantially orthogonal to the longitudinal axis of the first antenna and the longitudinal axis of the second antenna.

23. The method of claim 18, further comprising the steps of:
providing a radio-frequency identification radio within the tower portion of the bioptic barcode reader and in communication with the first, second, and third antennas; and
positioning and orienting the radio-frequency identification radio to act as a reflector for the first, second, and/or third antennas to reflect radio-frequency energy from the first, second, and third antennas towards a product scanning region of the bioptic barcode reader.

24. The method of claim 18, further comprising providing a back cover of the bioptic barcode reader with a reflector panel to reflect a radio-frequency energy from the first, second, and third antennas towards a product scanning region of the bioptic barcode reader.

25. The method of claim 18, further comprising the steps of:
positioning the first antenna along a top of the tower portion;
positioning the second antenna along a first vertical sidewall of the tower portion; and
positioning the third antenna along a second vertical sidewall of the tower portion, opposite the first vertical sidewall.

26. The method of claim 18, wherein:
the second antenna has a first portion and a second portion extending substantially orthogonal to the first portion; and
the third antenna has a first portion and a second portion extending substantially orthogonal to the first portion.

* * * * *